United States Patent
Wang et al.

(10) Patent No.: US 11,747,482 B2
(45) Date of Patent: Sep. 5, 2023

(54) APNT SERVICE POSITIONING AND INTEGRITY MONITORING METHOD AND SYSTEM

(71) Applicant: Beihang University, Beijing (CN)

(72) Inventors: Zhipeng Wang, Beijing (CN); Yanbo Zhu, Beijing (CN); Siqi Huang, Beijing (CN); Kun Fang, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 18/099,332

(22) Filed: Jan. 20, 2023

(65) Prior Publication Data

US 2023/0176228 A1    Jun. 8, 2023

Related U.S. Application Data

(63) Continuation of application No. PCT/CN2021/134998, filed on Dec. 2, 2021.

(51) Int. Cl.
*G01S 19/14* (2010.01)
*G01S 19/08* (2010.01)
*G01S 19/39* (2010.01)

(52) U.S. Cl.
CPC .............. *G01S 19/14* (2013.01); *G01S 19/08* (2013.01); *G01S 19/396* (2019.08)

(58) Field of Classification Search
CPC ......... G01S 19/14; G01S 19/396; G01S 19/08
(Continued)

(56) References Cited

U.S. PATENT DOCUMENTS

| | | | |
|---|---|---|---|
| 11,582,623 B2* | 2/2023 | Buer | H04W 24/02 |
| 2014/0232595 A1 | 8/2014 | Rife | |
| 2022/0015102 A1* | 1/2022 | Gallagher | H04B 7/18584 |

FOREIGN PATENT DOCUMENTS

| | | |
|---|---|---|
| CN | 103592656 A | 2/2014 |
| CN | 104483678 A | 4/2015 |

(Continued)

OTHER PUBLICATIONS

International Search Report of PCT/CN2021/134998, dated Aug. 25, 2022.

*Primary Examiner* — Harry K Liu
(74) *Attorney, Agent, or Firm* — Locke Lord LLP; Tim Tingkang Xia, Esq.

(57) ABSTRACT

The present invention discloses a APNT service positioning and integrity monitoring method and system. The method includes the following steps: determining a positioning accuracy requirement in a target scene; when the positioning accuracy requirement is high-accuracy positioning, determining a position of an aircraft by adopting a combined positioning algorithm, and monitoring the integrity of a combined positioning by adopting a multi-solution separation mode; when the positioning accuracy requirement is low-accuracy positioning, judging whether the aircraft is a high-altitude user; if not, adopting an air-to-air positioning algorithm for a high-altitude user and a low-altitude user based on LDACS to determine the position of the aircraft, and adopting a least square residual method to monitor the integrity of the air-to-air positioning. According to different requirements of users on positioning accuracy and actual application conditions, the present invention can provide a variety of APNT alternative solutions for an aircraft.

10 Claims, 4 Drawing Sheets

(58) Field of Classification Search
USPC .......................................................... 342/352
See application file for complete search history.

(56) References Cited

FOREIGN PATENT DOCUMENTS

| | | | | |
|---|---|---|---|---|
| CN | 110196434 | A | 9/2019 | |
| CN | 110687557 | A | 1/2020 | |
| CN | 111007552 | A | 4/2020 | |
| WO | WO-2020012241 | A1 * | 1/2020 | ......... G01C 21/3407 |
| WO | WO-2022011087 | A1 * | 1/2022 | ........... G01S 13/878 |

* cited by examiner

APNT SERVICE POSITIONING AND INTEGRITY MONITORING METHOD AND SYSTEM

CROSS-REFERENCE TO RELATED APPLICATION

This application is a continuation application of International Patent Application No. PCT/CN2021/134998, filed on Dec. 2, 2021. The disclosure of the above application is incorporated herein by reference in its entirety.

TECHNICAL FIELD

The present invention relates to the technical field of aviation navigation, in particular to an APNT service positioning and integrity monitoring method and system.

BACKGROUND ART

The modernization of aviation transportation system puts forward higher requirements for the performance of aviation navigation system. Global navigation satellite system (GNSS) mainly includes the Global Positioning System (GPS) of the United States and the Global Navigation Satellite System (GLONASS) of Russia, Galileo Satellite Navigation System in Europe and Beidou Satellite Navigation System (BDS) in China. With its high accuracy and high availability, GNSS has become the first system in the world to provide Positioning, Navigation and Timing (PNT) services.

However, due to the low power and long propagation distance of GNSS signals, the GNSS signals are easily interrupted by radio frequency interference during the propagation process. If only relying on the global satellite navigation system during the flight, the navigation information of the aircraft may be lost after the interference is interrupted, and even the flight accident may occur. As a common navigation system next to GNSS, Inertial Navigation Systems (INS) is limited in time because its errors will accumulate with time. Therefore, the existing navigation assistance system must be used as a backup system to provide Alternative Positioning, Navigation and Timing (APNT) services for aircraft when GNSS is unavailable, so as to build an aviation navigation network and ensure the continuity and integrity of flight.

The navigation auxiliary system mainly includes Distance Measuring Equipment (DME), VHF Omnidirectional Radio Range (VOR), Instrument Landing System (ILS), barometric altimeter and other new systems with navigation capability, such as L-band Digital Aeronautical Communication System (LDACS), etc.

At present, the next generation air transportation system (NextGen) in the United States and the Single European Sky ATM Research (SESAR) in Europe are all researching APNT services. Some alternative solutions (such as DME augmentation system, LDACS, SSR-based mode N, eLoran, etc.) are proposed, but further research is still needed to determine how to choose among these solutions in a sustainable way, while not bringing risks to the implementation of Dual-Frequency Multi-Constellation (DFMC) GNSS. SESAR studies the maturity of APNT services from three aspects: short-term, medium-term and long-term. Among them, the short-term research is mainly based on DME/DME solution to realize APNT service; In the mid-term, APNT service is mainly realized based on multi-DME positioning algorithm with Receiver Autonomous Integrity Monitoring (RAIM). The long-term goal is to realize APNT service through the advanced architecture of LDACS and eLORAN, which can provide better performance and use alternative technologies to support performance-based navigation (PBN)/Required Navigation Performance (RNP) operations. In the future, APNT service will combine existing navigation devices and new navigation technologies in a modular way to achieve the goal of RNP0.3 in the mobile area of terminals.

The development of APNT service faces many problems, among which the improvement of positioning accuracy and integrity monitoring are the most urgent problems to be solved.

SUMMARY

The purpose of the present invention is to provide an APNT service positioning and integrity monitoring method and system, which can realize integrity monitoring of the APNT service on the premise of improving positioning accuracy.

To achieve the above object, the present invention provides the following solutions:

an APNT service positioning and integrity monitoring method, including the following steps of:

determining a positioning accuracy requirement in a target scene;

when the positioning accuracy requirement is high-accuracy positioning, determining a position of an aircraft by adopting a combined positioning algorithm, and monitoring the integrity of a combined positioning by adopting a multi-solution separation mode;

when the positioning accuracy requirement is low-accuracy positioning, judging whether the aircraft is a high-altitude user;

if not, adopting an air-to-air positioning algorithm for a high-altitude user and a low-altitude user based on LDACS to determine the position of the aircraft, and adopting a least square residual method to monitor the integrity of the air-to-air positioning.

Optionally, the method further includes: when the aircraft is a high-altitude user, adopting a positioning algorithm based on DME/DME to determine the position of the aircraft, and monitoring the integrity of the positioning algorithm based on DME/DME.

Optionally, the step of monitoring the integrity of the positioning algorithm based on DME/DME specifically includes:

calculating the positions of the aircraft before and after the introduction of a new observation station;

calculating a protection level of the positioning algorithm based on DME/DME based on the positions of the aircraft before and after the introduction of the new observation station;

comparing the protection level with a level alarm limit required by a route to complete the monitoring of the integrity of the positioning algorithm based on DME/DME.

Optionally, the step of adopting an air-to-air positioning algorithm for a high-altitude user and a low-altitude user based on LDACS to determine the position of the aircraft specifically includes:

adopting a Multi-DME positioning algorithm to determine the position information of high-altitude users;

determining a measurement distance between a high-altitude user and a low-altitude user based on the two-way ranging function of LDACS;

determining the position of the aircraft according to the measured distance and the position information of the high-altitude user.

Optionally, the step of adopting a least square residual method to monitor the integrity of the air-to-air positioning specifically includes:

calculating a fault detection threshold according to a false detection probability of a system;

calculating a minimum detectable fault according to the detection threshold and a missed detection probability;

calculating a horizontal accuracy factor of the system;

calculating a horizontal protection level of the system from the minimum detectable fault and the level accuracy factor;

completing integrity monitoring of air-to-air positioning based on the horizontal protection level.

Optionally, the method of determining a position of an aircraft by adopting a combined positioning algorithm specifically comprises:

calculating a ranging error obtained by two-way ranging of m DME stations and a pseudo-range error obtained by one-way measurement of n LDACS stations;

constructing an observation equation of a ranging system based on the ranging error and the pseudo-range error;

taking a barometric altitude as an observation quantity, and introducing a barometric altimeter into the system to obtain an altitude observation equation;

constructing an observation model of the system based on the observation equation and the altitude observation equation;

solving the observation model by the least square method to determine the position of the aircraft.

Optionally, the step of monitoring the integrity of a combined positioning by adopting a multi-solution separation mode specifically includes:

calculating a state main estimate and a state sub-estimate based on the observation model of the system;

calculating a difference covariance matrix based on the state main estimate and the state sub-estimate;

constructing horizontal position test statistics based on the difference covariance matrix;

calculating the fault detection threshold according to the false detection probability;

determining whether there is a fault or not according to the test statistics and the detection threshold;

if there is a fault, isolating the fault and calculating the protection level of the system;

if there is no fault, directly calculating the protection level of the system;

completing the integrity monitoring of combined positioning according to the protection level.

An APNT service positioning and integrity monitoring system, including:

a requirement determining module configured to determine a positioning accuracy requirement in a target scene;

a first positioning and integrity monitoring module configured to, when the positioning accuracy requirement is high-accuracy positioning, determine a position of an aircraft by adopting a combined positioning algorithm, and monitor the integrity of a combined positioning by adopting a multi-solution separation mode;

a judging module configured to, when the positioning accuracy requirement is low-accuracy positioning, judge whether the aircraft is a high-altitude user;

a second positioning and integrity monitoring module configured to adopt an air-to-air positioning algorithm for a high-altitude user and a low-altitude user based on LDACS to determine the position of the aircraft when the aircraft is a low-altitude user, and adopt a least square residual method to monitor the integrity of the air-to-air positioning.

Optionally, the system further includes a third positioning and integrity monitoring module configured to adopt a positioning algorithm based on DME/DME to determine the position of the aircraft when the aircraft is a high-altitude user, and monitor the integrity of the positioning algorithm based on DME/DME.

Optionally, as for adopting an air-to-air positioning algorithm for a high-altitude user and a low-altitude user based on LDACS to determine the position of the aircraft, the second positioning and integrity monitoring module specifically includes:

high-altitude user position information unit configured to adopt a Multi-DME positioning algorithm to determine the position information of high-altitude users;

a measurement distance determination unit configured to determine a measurement distance between a high-altitude user and a low-altitude user based on the two-way ranging function of LDACS;

a position determination unit configured to determine the position of the aircraft according to the measured distance and the position information of the high-altitude user.

According to the specific embodiment provided by the present invention, the present invention discloses the following technical effects:

The present invention provides an APNT service positioning and integrity monitoring method and system. Under the condition that the accuracy of GNSS-based aviation navigation is degraded or even unavailable due to interference, a plurality of APNT alternative solutions are provided for aircraft according to different requirements of users on positioning accuracy and actual application conditions, and fault detection algorithms are researched for each alternative solution to realize integrity monitoring of APNT services.

BRIEF DESCRIPTION OF THE DRAWINGS

In order to more clearly explain the embodiments of the present invention or the technical solutions in the prior art, the following will briefly introduce the drawings that need to be used in the embodiments. Obviously, the drawings in the following description are only some embodiments of the present invention. For those of ordinary skill in the art, other drawings can be obtained according to these drawings without any creative labor.

DETAILED DESCRIPTION

The technical solutions in the embodiments of the present invention will be clearly and completely described below with reference to the drawings in the embodiments of the present invention. Obviously, the described embodiments are only part of the embodiments of the present invention, but not all of them. Based on the embodiment of the present invention, all other embodiments obtained by ordinary technicians in the field without creative labor are within the scope of the present invention.

The most basic APNT method is based on DME/DME to achieve positioning, but this method requires users to continuously transmit information with a certain number of DME stations during the flight. However, for aircraft with low flying altitude, due to the influence of terrain and urban environment, some ground DME ranging sources may be blocked, which leads to the decrease of positioning accuracy calculated by users, and even leads to the unavailability of APNT when the number of ranging sources drops to a certain extent. To solve this problem, according to the two-way ranging function of LDACS, the present invention uses high-altitude users with high positioning accuracy through Multi-DME as airborne ranging sources to provide location information for low-altitude users, which is similar to positioning through pseudo-range measurement in GNSS, and realizes integrity monitoring of air-to-air cooperative positioning based on the least squares residual algorithm, and further calculates the protection level of the system with the minimum detectable fault. However, for users with higher positioning accuracy requirements, the positioning accuracy that this method can provide is limited. To solve this problem, the present invention puts forward a positioning method combining DME, LDACS and barometric altimeter, and realizes positioning by using residual minimization algorithm by combining three measurement quantities, ranging, pseudo-range measurement and height measurement. This method can provide users with higher positioning accuracy.

Another important problem faced by APNT is integrity monitoring. RNP requires airborne equipment to have On-Board Performance Monitoring and Alerting (OPMA), but DME/DME positioning may not support this RNP navigation specification. Therefore, the concept of On-Ground Performance Monitoring and Alerting (GPMA) based on RNP is proposed, which is similar to RAIM algorithm commonly used in GNSS to monitor the integrity of DME/DME system. For the positioning method combining DME, LDACS and air pressure altimeter, the integrity monitoring is mainly carried out through redundant measurement. The system observation model is constructed, and the APNT fault monitoring and isolation is realized by multi-solution separation method.

In view of this, the present invention provides a method and system for positioning and integrity monitoring of APNT service, which can realize integrity monitoring of APNT service on the premise of improving positioning accuracy.

In order to make the above objects, features and advantages of the present invention more obvious and understandable, the present invention will be explained in further detail below with reference to the drawings and detailed description.

The purpose of the present invention is mainly realized by the following technical solution:

1. Realizing accurate positioning and accuracy estimation of high-altitude users by DME/DME.

2. Determining the fault mode introduced in DME/DME positioning, calculating its corresponding position deviation, realizing fault detection by introducing a new observation station, calculating the system protection level, and comparing the protection level with the alarm limit to judge the availability of the system.

3. Realizing the positioning of high-altitude users by Multi-DME, and the air-to-air cooperative positioning between high-altitude users and realizing low-altitude users based on the two-way ranging function of LDACS.

4. Realizing the positioning of high-altitude users by Multi-DME, and the air-to-air cooperative positioning between high-altitude users and realizing low-altitude users based on the two-way ranging function of LDACS.

5. Determining the fault mode introduced in air-to-air positioning, designing a fault detection algorithm according to its characteristics, model the residual error of positioning error, and calculating the protection level of the system.

6. Using the least square method is used to realize the high-accuracy positioning of users by DME/LDACS/barometric altimeter.

7. Using Multi-solution separation algorithm to monitor the integrity of integrated positioning, calculating the positioning errors of the complete set and the corresponding subsets, detecting and eliminating APNT faults, calculating the protection level of the system and judge the availability of the system.

Example 1

Figure 1:
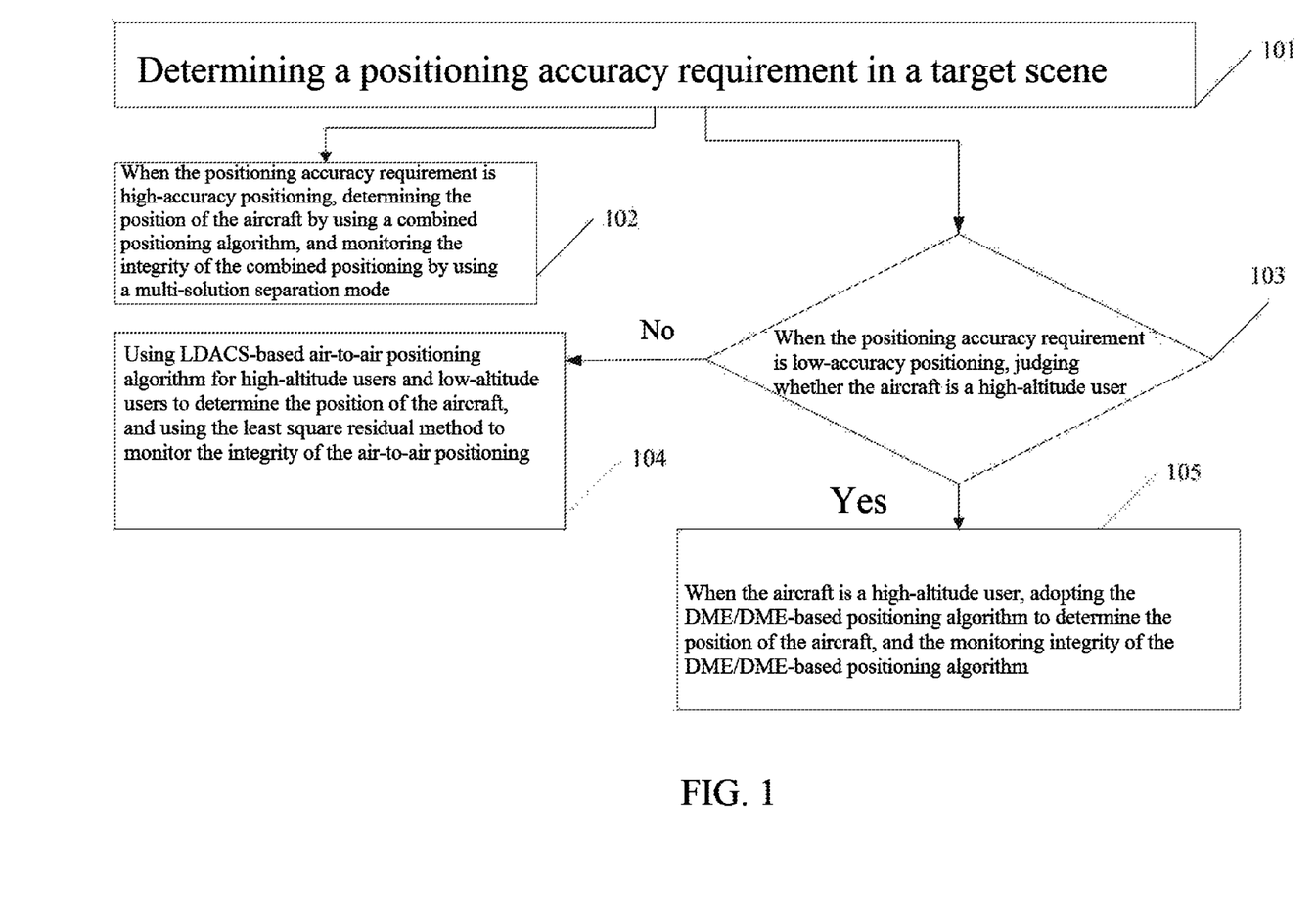
FIG. 1 is a flowchart of an APNT service positioning and integrity monitoring method according to the present invention.
Figure 2:
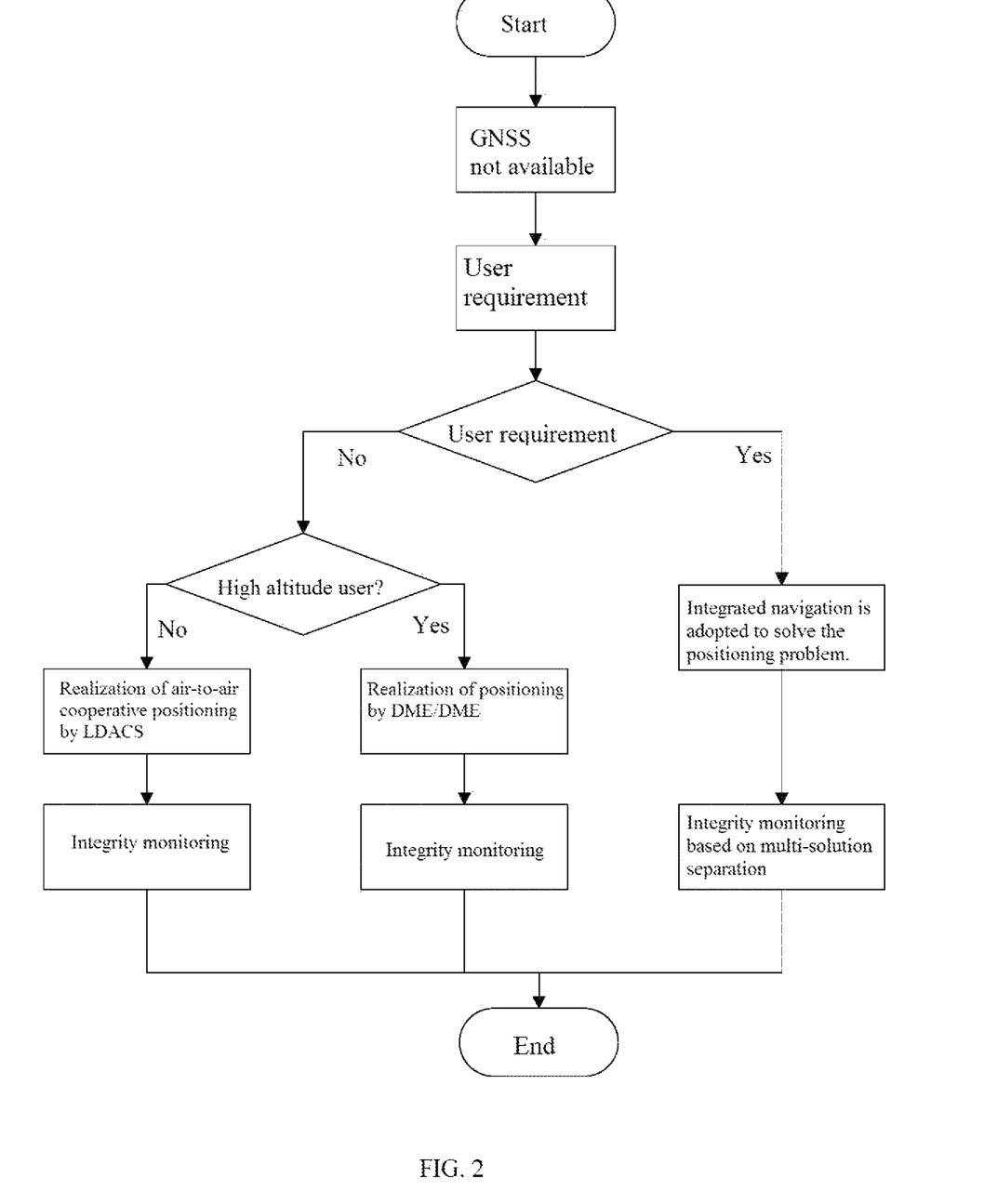
FIG. 2 is an overall flow chart of an APNT service positioning and integrity monitoring method of the present invention.

As shown in FIG. 1 and FIG. 2, an APNT service positioning and integrity monitoring method provided in this embodiment includes the following steps.

Step 101: determining a positioning accuracy requirement in a target scene; wherein the target scene is a scene when GNSS is unavailable.

Step 102: when the positioning accuracy requirement is high-accuracy positioning, determining the position of the aircraft by using a combined positioning algorithm, and monitoring the integrity of the combined positioning by using a multi-solution separation mode.

Step 103, when the positioning accuracy requirement is low-accuracy positioning, judging whether the aircraft is a high-altitude user; if not, step 104 is executed; if yes, step 105 is executed.

Step 104: using LDACS-based air-to-air positioning algorithm for high-altitude users and low-altitude users to determine the position of the aircraft, and using the least square residual method to monitor the integrity of the air-to-air positioning.

Step 105: when the aircraft is a high-altitude user, adopting the DME/DME-based positioning algorithm to determine the position of the aircraft, and the monitoring integrity of the DME/DME-based positioning algorithm.

Step 105 specifically includes:

1. positioning principle based on DME/DME

DME refers to rangefinder, which is a kind of ranging equipment widely used in aviation navigation. It consists of airborne interrogator and ground transponder. When in operation, the interrogator sends an interrogation signal, and the responder sequentially transmits responses synchronized with the interrogation signal. In this way, a DME system can measure the oblique distance between the aircraft and the ground station. A single DME station cannot locate the aircraft, and the position of the aircraft can only be determined when two or more DME stations receive signals at the same time.

When positioning based on DME/DME positioning principle, the aircraft must be located within the coverage area of DME stations and be able to receive the input signals of at least two DME stations at the same time. If only two DME stations can receive input, the angle between the aircraft and the two DME stations must be between 30 and 150 degrees. DME/DME is one of the main ways to support Regional Area Navigation (RNAV), and its positioning accuracy is inferior to GNSS.

2. DME/DME integrity monitoring algorithm, which specifically includes: calculating the aircraft position before and after the introduction of the new observation station; calculating the protection level of the DME/DME-based positioning algorithm based on the aircraft position before and after the introduction of the new observation station; comparing the protection level with the level alarm limit required by the route to complete the integrity monitoring of the positioning algorithm based on DME/DME; The detailed process is as follows:

A DME signal may be threatened by two kinds in the process of propagation. On the one hand, it may be affected by terrain, resulting in wrong ranging information; on the other hand, it may be interfered by other signals in the same channel, resulting in wrong signal reception. The former can be improved by changing the signal waveform and the echo suppression mechanism, while the latter needs to study the frequency allocation and compatibility of signals. Here, the present invention unifies it as a transponder fault, which will be reflected in the position deviation of DME station, causing the average value of DME error distribution to be non-zero.

Assuming that DME error obeys normal distribution, the average error of non-fault transponder is zero, and the average error of fault transponder is equal to station deviation:

$$e_{D_i} = N(\mu_{D_i}, \sigma_{D_i}) \quad (1);$$

where, $\sigma_{D_i}$ refers to the standard deviation of the ranging deviation of a DME station, $\sigma_{D_i} = \sqrt{\sigma_{SiS}^2 + \sigma_{air}^2}$, $\sigma_{SiS} = 0.05\text{NM}$, $\sigma_{air} = \max\{0.085\text{NM}, 0.00125D_i\}$, $D_i$ refers to the tilt distance.

Based on the calculated positions of two DME stations i, j, the horizontal position error is obtained:

$$e_{DD_{ij}} = \frac{e_{D_i} + e_{D_j}}{\sin\alpha_{ij}}; \quad (2)$$

where $\alpha_{ij}$ is the angle between the aircraft and two stations, $e_{DD_{ij}}$ should obey the normal distribution:

$$e_{D_{ij}} = N(\mu_{DD_{ij}}, \sigma_{DD_{ij}}) \quad (3);$$

where:

$$\mu_{DD_{ij}} = \frac{\mu_{D_i} + \mu_{D_j}}{\sin\alpha_{ij}}; \quad (4)$$

A single fault scenario is designed: suppose that the aircraft gets the initial effective position through two DME stations without faults, but with the change of aircraft position, the initial two stations no longer meet the geometric conditions, so a new observation station DME3 needs to be introduced to replace the initial station. Flight Management System (FMS) compares the aircraft position before the new observation station with the introduced position, determines the potential ranging deviation, and then calculates the protection level of the position solution.

Make the ranging error $R_{12}$ obtained based on two fault-free initial stations obey $N(0, \sigma_{DD_{12}})$, and the ranging error $R_3$ based on fault DME3 obey $N(\mu, \sigma_D)$. The fault judgment form is:

$$|R_{12} - R_3| > T \rightarrow \text{failure} \quad (6);$$

Define test statistics $R = R_{12} - R_3$, where $\sigma T_R = \sqrt{\sigma_{DD_{12}}^2 + \sigma_D^2}$. If DME3 has no+2 fault, and the test statistics R obey $N(0, \sigma_R)$, the fault detection threshold T can be obtained from the false detection probability $P_{fd}$:

$$\frac{2}{\sqrt{2\pi}} \int_T^\infty e^{-\frac{x^2}{2}} dx = P_{fd}; \quad (7)$$

If DME3 is faulty, the test statistics R obey $N(\mu, \sigma_R)$, and the minimum detectable deviation $\mu_m$ can be obtained from the missed detection probability $P_{md}$ and the detection threshold T:

$$P_{md} = \frac{1}{\sqrt{2\pi}} \int_{-\infty}^T e^{-\frac{(x-\mu_m)^2}{2}} dx; \quad (8)$$

Here, it is assumed that the aircraft uses DME3 and DME1 for ranging, and the calculation of the Horizontal Protection Level (HPL) of the system is realized by deviation detection:

$$HPL = \mu_{DD_{13}} = \frac{\mu_m}{\sin\alpha_{13}}; \quad (9)$$

HPL is compared with the level alarm limit required by the route. If the protection level is greater than the alarm limit, the system will not be available.

The air-to-air positioning algorithm for high-altitude users and low-altitude users based on LDACS is adopted to determine the position of the aircraft, which specifically includes:

adopting the Multi-DME positioning algorithm to determine the position information of high-altitude users; determining the measurement distance between the high-altitude user and the low-altitude user based on the two-way ranging function of LDACS; determining the position of the aircraft according to the measured distance and the position information of high-altitude users. The detailed process is as follows:

(1) Air-to-Air Positioning Algorithm for High-Altitude Users and Low-Altitude Users Based on LDACS Due to the influence of terrain occlusion, the performance of low-altitude users in receiving and transmitting navigation signals is limited, and it is difficult to achieve positioning. Compared with this, high-altitude users can obtain ranging information and ranging error information from more ground ranging sources, such as Multi-DME method to achieve accurate positioning, and broadcast their own position information and covariance matrix to low-altitude users as airborne ranging sources. Combined with the air-to-air communication capability of LDACS, the distance between high-altitude users and low-altitude users can be measured, and low-altitude users can achieve their own position acquisition. Considering the limited number of high-altitude ranging sources, only two-dimensional positioning is carried out here, and the altitude measurement is assisted by the barometric altimeter.

Air-to-air measurement $y_A$ is carried out according to the position measurement of high-altitude user ranging source A, and its position error $\varepsilon_A$ obeys the distribution N $(0, \Sigma_A)$. The distance between low-altitude users and airborne ranging sources n is:

$$r^{(n)} = (x_u - x^{(n)}) \cdot 1_{(n)} + T^{(n)} + M^{(n)} + c \cdot (dt^{(n)} - dt_u) + \varepsilon^{(n)} \quad (10);$$

Wherein $x_u$ and $x^{(n)}$ are the positions of aircraft and ranging source, $\varepsilon^{(n)}$ is a ranging error, $T^{(n)}$ is a tropospheric delay, $M^{(n)}$ is a multipath effect, $dt^{(n)}$ is a clock offset of the airborne ranging source and $dt_u$ is a clock offset of a user receiver. $1^{(n)}$ is a set of unit vectors along the connecting direction of user receiver and ranging source, which are called LoS (Light of Sight) vectors here.

Under the background of RNP operation, the influence of tropospheric delay $T^{(n)}$ and multipath effect $M^{(n)}$ can be neglected, because they usually only cause random errors which are several orders of magnitude smaller than $\sigma_r$. Pseudo-range measurement between airborne ranging source and low-altitude users is realized by the two-way ranging function of LDACS:

$$r\Pi = c \cdot (t_u - t_n) \quad (11);$$

where, $t_u$ and $t_n$ represent the transmission time and reception time of the signal, respectively, and c represents the speed of light.

In the air-to-air positioning algorithm, the airborne ranging source is different from the satellite or ground ranging source, and its position itself has non-negligible uncertainty. It can be regarded as the ephemeris error in the satellite, which is obtained by adding the noise $\sigma_r$ in the distance measurement and the uncertainty of the airborne ranging source along the LoS. The ranging error $\varepsilon^{(n)}$ at low altitude user j can be approximately zero-mean Gaussian distribution $N(0, \sigma_{n,j})$, where:

$$\sigma_{n,j}^2 = \sigma_r^2 + \|\Sigma \square 1_{n,j}\| \quad (12);$$

$\Sigma_n$ is the error covariance matrix, which represents the location of the ranging source, is related to the uncertainty of the location of the ranging source itself, and reflects the accuracy of the distance measurement value obtained from the ranging source signal. As the airborne ranging source is positioned by Multi-DME, its positioning accuracy can be expressed as follows:

$$\sigma_{position} = GDOP \cdot \sigma_D = \sqrt{\operatorname{trace}(H^T H)^{-1}} \cdot \sigma_D \quad (13);$$

where H represents the direction cosine matrix between the ranging source and its DME stations, then, $$\Sigma_n = G^T \sigma_{position}^2 G = G^T (\operatorname{trace}(H^T H)^{-1} \sigma_D^2) G \quad (14);$$

Then, the variance of the ranging error is expressed as:

$$\sigma_n^2 = \sigma_r^2 + \|(G^T (\operatorname{trace}(H^T H)^{-1} \sigma_D^2) G) \cdot 1_{n,j}\| \quad (15);$$

Use the two equations (10) and (11) to solve the position by the weighted minimum residual method:

$$\delta x_i = (G^T W G^1)^{-1} G^T W \delta r_i \quad (16);$$

where G is a geometric matrix composed of line-of-sight unit vectors, which is related to the geometric position of ranging sources relative to users. W is a weighted matrix reflecting the ranging errors caused by each ranging source, and its diagonal elements $$w_n = \frac{1}{\sigma_n}, \delta r_i$$

are ranging corrections obtained in the iterative process. When $\|x_{i+1} - x_i\| \leq \varepsilon$, $\varepsilon > 0$, the user position converges to $\hat{x}$, and the positioning errors obey multivariate Gaussian distribution $N(0, \Sigma)$ and covariance matrix $\Sigma = (G^T W G)^{-1}$.

(2) The Integrity Monitoring of Air-to-Air Cooperative Positioning Based on the Least Squares Residual Method Includes:

calculating the fault detection threshold through the false detection probability of the system; calculating the minimum detectable fault according to the detection threshold and the missed detection probability; calculating the horizontal accuracy factor of the system; calculating the horizontal protection level of the system from the minimum detectable fault and the level accuracy factor; completing the integrity monitoring of air-to-air positioning based on the horizontal protection level. The detailed process is as follows:

Air-to-air cooperative positioning can realize integrity monitoring by least square residual method.

The linearized pseudo-range observation equation is as follows:

$$Y = GX + \varepsilon \quad (17)$$

The position estimation that minimizes the sum of squares of ranging errors is obtained by the least square method;

$$\hat{x} = (G^T W G)^{-1} G^T W Y \quad (18);$$

The ranging residual vector is expressed as:

$$\begin{aligned} v &= Y - G\hat{X} \\ &= [W^{-1} - G(G^T W G)^{-1} G^T] W Y \\ &= Q_v W Y \end{aligned} \quad (19)$$

where $Q_v$ is the co-factor matrix of pseudo-range residual vector. Under the fault-free condition, the weighted norm of the residual vector obeys the central $\chi^2$ distribution with the degree of freedom of N−2:

$$m^2 = |v| = v^T W v \sim \chi_{N-2}^2 \quad (20);$$

Air-to-air co-location introduces a new failure mode, which may lead to new potential integrity risks. Similar to the ephemeris fault in satellite navigation, in air-to-air cooperative positioning, the position broadcast of airborne ranging source may have a fault $\Delta x$, which will be reflected in the ranging error through the line-of-sight vector:

$$r_{(n)} = (x_u - (x^{(n)} + \Delta x)) \cdot 1^{(n)} + c \cdot (dt^{(n)} - dt_y) + \varepsilon^{(n)} \quad (21);$$

Let $\Delta r = \Delta x \cdot 1^{(n)}$, then the ranging expression under this fault is:

$$r^{(n)} = (x_u - x^{(n)}) \cdot 1^{(n)} + \Delta r^{(n)} + c \cdot (dt^{(n)} - dt_u) + \varepsilon^{(n)} \quad (22);$$

When the fault occurs, the error caused by the ranging fault causes the pseudo-range residual vector to change, and the average value of the ranging error corresponding to the location of the fault ranging source in the vector is no longer zero, which makes the norm of the pseudo-range residual vector obey the noncentral $^2$ distribution. The noncentral parameters are:

$$m^2 = |v| \sim \chi_{N-2, \Delta r^2}^2 \quad (23);$$

In order to evaluate the minimum detectable failure of the system, that is, the maximum possible failure when the missed detection probability is equal to the specified integrity risk. Firstly, the fault detection threshold is calculated by the false detection probability $P_{fd}$ of the system:

$$P_{fd} = \int_{T_D}^{\infty} f_{\chi^2_{N-2}}(x)dx = 1 - \chi^2_{N-2}(T_D^2); \qquad (24)$$

The minimum detectable fault is calculated according to the detection threshold and the probability of missing detection; $E_r$:

$$P_{md} = \int_0^{T_D} f_{\chi^2_{N-2,E_r^2}}(x)dx = \chi^2_{N-2,E_r^2}(T_D^2); \qquad (25)$$

In the actual navigation process, even if there is no fault, the integrity monitoring algorithm may not be available because the geometric configuration of the visible ranging source is not ideal. In order to judge the usability of the algorithm, it is necessary to calculate the horizontal protection level. The variation $\delta HDOP_i$ of the horizontal accuracy factor is obtained from the horizontal accuracy factor HDOP of the geometric configuration of the airborne ranging source and the horizontal accuracy factor $HDOP_i$ after removing the $i^{th}$ ranging source:

$$\delta HDOP_i = \sqrt{HDOP_i^2 - HDOP^2} = \sqrt{\frac{A_{1i}^2 + A_{2i}^2}{Q_{vii}}}; \qquad (26)$$

Finally, the horizontal protection level of the system is calculated from the minimum detectable fault $E_r$ and the HDOP (horizontal accuracy factor) of the system:

$$HPL = \delta HDOP_{max} \times \sigma_A \times E_r \qquad (27).$$

The method for determining the position of the aircraft by adopting the combined positioning algorithm specifically comprises:
calculating the ranging error obtained by two-way ranging of m DME stations and the pseudo-range error obtained by one-way measurement of n LDACS stations; constructing an observation equation of a ranging system based on the ranging error and the pseudo-range error; taking the barometric altitude is taken as the observation quantity, and introducing the barometric altimeter into the system to obtain the altitude observation equation; building a systematic observation model based on the observation equation and the altitude observation equation; solving the observation model by the least square method to determine the position of the aircraft.

(1) Combined Positioning Algorithm

When GNSS is unavailable, APNT algorithm based on DME/DME or LDACS can provide users with basic PNT functions in different airspace, and the integrity monitoring algorithm mentioned above can provide users with the required navigation performance.

Figure 3:
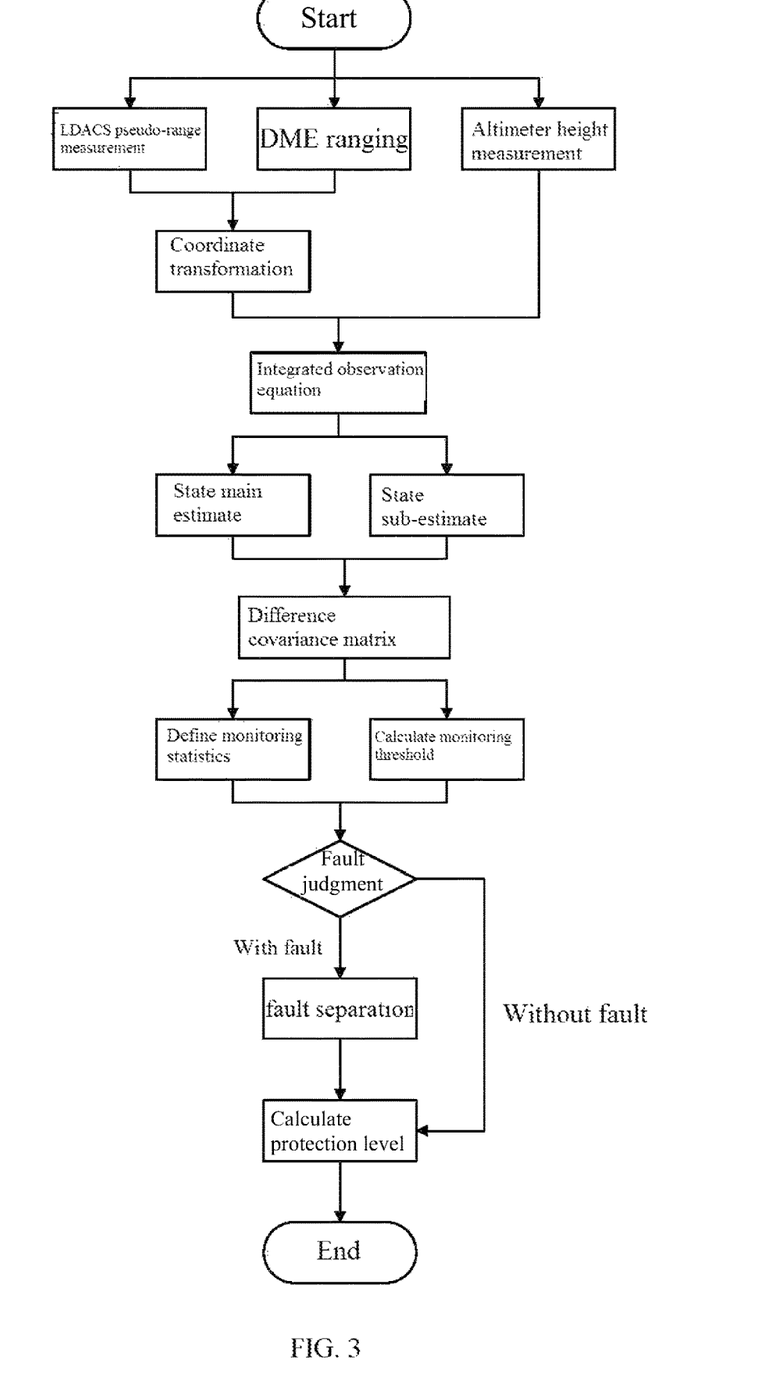
FIG. 3 is a hierarchical structure diagram of the multi-solution separation method of the present invention.

In order to further meet the higher requirements of some users for positioning accuracy and integrity, multiple positioning methods can be combined to improve redundant measurement, for example, DME, LDACS and barometric altimeter are combined to perform positioning based on residual minimization algorithm. See FIG. 3 for the algorithm block diagram. DME provides two-way ranging, LDACS provides one-way pseudorange measurement, and barometric altimeter provides altitude information by measuring air pressure. By combining the measurement information of each system, higher accuracy positioning can be achieved.

Firstly, the ranging error of DME and LDACS is calculated.

The ranging error obtained from two-way ranging by m DME stations is:

$$y_D(x) = \begin{pmatrix} \rho_1 - \|s_1 - \hat{x}\| \\ \vdots \\ \rho_m - \|s_m - \hat{x}\| \end{pmatrix} = \begin{pmatrix} \rho_1 - \hat{\rho}_1 \\ \vdots \\ \rho_m - \hat{\rho}_m \end{pmatrix}; \qquad (28)$$

where, $\rho_i$ is the distance measured by the $i_{th}$ DME station, $s_i$ is the position of the $i^{th}$ DME station and i is the user position.

The pseudo-range error obtained by unidirectional measurement of n LDACS stations is:

$$y_L(x) = \begin{pmatrix} \rho_{L1} - (\|s_{L1} - \hat{x}\| + dt) \\ \vdots \\ \rho_{Ln} - (\|s_{Ln} - \hat{x}\| + dt) \end{pmatrix} = \begin{pmatrix} \rho_{L1} - \hat{\rho}_{L1} \\ \vdots \\ \rho_{Ln} - \hat{\rho}_{Ln} \end{pmatrix}; \qquad (29)$$

where $\rho_{Lj}$ is the pseudo-range measured by the $j^{th}$ LDACS station, $s_{Lj}$ is the position of the $j^{th}$ LDACS station, $\hat{x}$ is the user position and idt the clock deviation.

The two are combined, the observation equation of the ranging system is obtained:

$$y = Gx + \varepsilon = \begin{bmatrix} a_{1,1} & a_{1,2} & a_{1,3} & 0 \\ \vdots & \vdots & \vdots & \vdots \\ a_{m,1} & a_{m,2} & a_{m,3} & 0 \\ a_{m+1,1} & a_{m+1,2} & a_{m+1,2} & -1 \\ \vdots & \vdots & \vdots & \vdots \\ a_{m+n,1} & a_{m+n,2} & a_{m+n,3} & -1 \end{bmatrix} \begin{bmatrix} \Delta x \\ \Delta y \\ \Delta z \\ cdt \end{bmatrix} + \begin{bmatrix} \varepsilon_D \\ \varepsilon_L \end{bmatrix}; \qquad (30)$$

Where y is the observation, that is, a difference between the distance measurement and the approximate calculation distance; G is the observation matrix and $a_{i,j}$ is the coefficient of the observation matrix; x is the state quantity to be estimated composed of three position errors ($\Delta r$, $\Delta y$, $\Delta z$) and receiver clock deviation dt in the earth coordinate system; $\varepsilon_D$ is the m×1-order vector, and $\varepsilon_L$ is the n×1-order vector, which respectively represent the ranging deviation vectors caused by propagation uncertainty and receiver noise in DME and LDACS ranging process, and their standard deviations are $\sigma_D$ and $\sigma_L$ respectively.

In order to introduce the observation information of the barometric altimeter into the observation equation, it is necessary to project the state quantity into the geographic coordinate system, and the coordinate conversion formula is as follows:

$$\lambda = \arctan\left(\frac{y}{x}\right); \qquad (31A)$$

$$h = \frac{\sqrt{x^2 + y^2}}{\cos\phi} - N; \qquad (31B)$$

$$\phi = \arctan\left[\frac{z}{\sqrt{x^2 + y^2}}\left(1 - e^2\frac{N}{N+h}\right)^{-1}\right]; \qquad (31C)$$

Where, $$N = \frac{a}{\sqrt{1-e^2\sin^2\phi}},$$

a is me long radius of the reference ellipsoid and e the flat heart rate of the ellipsoid.

From this iteration, the ranging error in geographic coordinate system can be obtained, which is expressed as:

$$\begin{bmatrix} \Delta\phi \\ \Delta\lambda \\ \Delta h \end{bmatrix} = A \begin{bmatrix} \Delta x \\ \Delta y \\ \Delta z \end{bmatrix}; \quad (32)$$

where, $\phi, \lambda$ and h represent latitude, longitude and altitude, respectively, and A represents the coordinate transformation matrix.

The barometric altitude is taken as the observation quantity, and the barometric altimeter is introduced into the system to obtain the altitude observation equation:

$$H_B - \hat{H} = \Delta h + \varepsilon_B \quad (33);$$

where, $H_B$ is the barometric altitude, $\hat{H}$ is the estimated user altitude, $\varepsilon_B$ indicates the measurement error of the barometric altimeter, which obeys the zero-mean Gaussian distribution, and its standard deviation is $\sigma_B$.

Combining the above observations, a new observation equation is obtained:

$$Z = \begin{bmatrix} \rho_1 - \hat{\rho}_1 \\ \vdots \\ \rho_m - \hat{\rho}_m \\ \rho_{L1} - \hat{\rho}_{L1} \\ \vdots \\ \rho_{L1} - \hat{\rho}_{Ln} \\ H_B - \hat{H} \end{bmatrix} = HX + V = \begin{bmatrix} AG \\ 0\ 0\ 1\ 0 \end{bmatrix} \begin{bmatrix} \Delta\phi \\ \Delta\lambda \\ \Delta h \\ cdt \end{bmatrix} + \begin{bmatrix} \varepsilon_D \\ \varepsilon_L \\ \varepsilon_B \end{bmatrix}; \quad (34)$$

where, Z represents the observation information, including the observation of DME, LDACS and barometric altimeter; H represents the observation matrix; X is state quantity, including three position errors in geographic coordinate system and ranging errors equivalent to receiver clock error; V is the measurement noise matrix, with the mean value of 0 and the variance matrix of $$R = \begin{bmatrix} \sigma_D^2 I_{m\times m} & & \\ & \sigma_L^2 I_{n\times n} & \\ & & \sigma_B^2 \end{bmatrix};$$

AG is the n×4-order matrix, which represents the navigation system observation matrix obtained by coordinate transformation of the observation matrix G.

According to the system model, the positioning solution can be obtained by the least square method. When the number of DME and LDACS stations exceeds three, the equation (32) has a unique solution: $\Delta\phi_1, \Delta\lambda_1, \Delta h_1$; it is superimposed on the initial position $\phi_0, \lambda_0, h_0$ to obtain the next approximate position, which is substituted into the equation (32) to iterate until $\Delta\phi_i, \Delta\lambda_i, \Delta h_i$ reaches the required magnitude, and the least square solution of the user position in the geographic coordinate system can be obtained.

(2) APNT Integrity Monitoring Based on Multi-Solution Separation Includes:

calculating a state main estimate and a state sub-estimate based on the observation model of the system, calculating a difference covariance matrix based on the state main estimate and the state sub-estimate; Based on the difference covariance matrix, constructing horizontal position test statistics; calculating a fault detection threshold according to the false detection probability; determining whether there is a fault or not according to the test statistics and the detection threshold; if there is a fault, isolating the fault and calculating the protection level of the system; if there is no fault, directly calculating the protection level of the system; completing the integrity monitoring of combined positioning according to the protection level.

Fault Detection

On the basis of establishing the observation model of the combined system, the integrity monitoring of APNT is realized by multi-solution separation method. The estimation obtained by using all the observations is defined as the main estimate, and the estimation obtained after excluding one observation is defined as the sub-estimate. Set the fault threshold, and realize APNT fault monitoring and isolation by comparing the difference between different estimates with the set threshold.

According to the observation equation, the main estimate of the state under full observation can be obtained:

$$X_0 = Q_0 Z = (H^T W H)^{-1} H^T W Z \quad (35);$$

Where $W = R^{-1}$ is a positive definite weighted matrix, $Q_0$ is the least square solution matrix under the condition of complete observation, and the dimension is 4×(m+n+1) order. The $i^{th}$ distance observation, is removed and the remaining observation information is used to solve the state to obtain the state sub-estimate:

$$X_i = Q'_i Z_i = (H_i^T W_i H_i)^{-1} H_i^T W_i Z_i (i=1,2,\ldots,m+n) \quad (36);$$

where, $Q'_i$ represents the 4×(m+n)-order least squares solution matrix under the condition of incomplete observation after excluding the $i^{th}$ distance observation. In order to facilitate the subsequent calculation, the sub-estimate is obtained by expanding $Q'_i$ to a 4×(m+n+1)-order matrix by zero-padding for the $i^{th}$ column:

$$X_i = Q_i Z (i=1,2,\ldots,m+n) \quad (37);$$

Then the covariance matrix of the difference between the main estimate and the sub-estimate is:

$$dP_i = E[(X_0 - X_i)(X_0 - X_i)^T]$$

$$E[(Q_0 - Q_i) Z Z^T (Q_0 - Q_i)^T]$$

$$(Q_0 - Q_i) R (Q_0 - Q_i)^T \quad (38);$$

Based on this, the horizontal position test statistics $d_i = \sqrt{dP_i(1,1) + dP_i(2,2)}$ are constructed, and the fault detection threshold $T_i$ is calculated according to the false detection probability $P_{fd}$:

$$T_i = \sqrt{\lambda^{dP_i}} \operatorname{erf}^{-1}\left(\frac{P_{fd}}{2(m+n)}\right); \quad (39)$$

where, $\lambda^{dP_i}$ is the maximum feature value corresponding to the middle horizontal position direction, and $\operatorname{erf}^{-1}$ is the inverse function of $$\text{erf}(x) = \frac{1}{\sqrt{2\pi}} \int_x^\infty e^{-\frac{t^2}{2}} dt.$$

The fault judgment is carried out according to the m+n groups of test statistics and the fault detection threshold based on:
(1) No fault $H_0$: all test statistics satisfy $d_i \leq T_i$;
(2) There is a fault $H_1$: at least one set of test statistics satisfies $d_i > T_i$.

Fault Separation

After the fault is detected, it is necessary to locate and identify the fault so as to realize fault isolation. Through sub-estimate $X_i$ and secondary estimate $X_{i,j}$, the processing process is similar to the fault detection process. It is necessary to calculate the test statistics $d_{i,j}$ and detection threshold $T_{i,j}$ first, and then make a judgment. The basis for judging the fault of the $n^{th}$ ranging source is: if there is only one sub-estimate $X_n$ and the test statistics $X_{n,j}$ of all its secondary estimate are less than the fault detection threshold, the $n^{th}$ ranging source needs to be isolated.

If all the sub-estimates and their corresponding sub-estimates are larger than the fault detection threshold, it means that there is a fault of multiple ranging sources, which needs to be further analyzed by analogy with this method.

Figure 4:
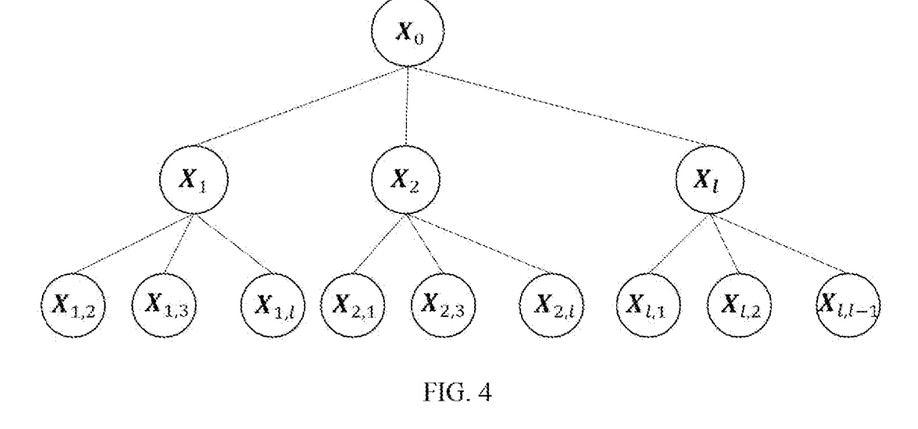
FIG. 4 is a flow chart of APNT integrity monitoring algorithm with multi-solution separation according to the present invention.

The hierarchical structure of multi-solution separation method is shown in FIG. 4.

Protection Level Calculation

After the integrity monitoring, the usability under the integrity requirements should be judged, and the horizontal protection level and Vertical Protection Level (VPL) of the aircraft should be calculated.

$HPL_i$ corresponding to each sub-estimate $X_i$ is composed of two parts: one is the threshold for separating the sub-estimate $X_i$ from the main estimate $X_0$, that is, the fault detection threshold $T_i$ calculated by the false detection probability $P_{fd}$; the second is to estimate its own horizontal position error threshold $a_i$, namely:

$$HPL_i = T_i + a_i \quad (40);$$

The error covariance matrix of sub-estimate $X_i$ is defined as:

$$P_i = E[\delta X_i \delta X_i^T] = Q_i R Q_i^T \quad (41);$$

$\lambda^{P_i}$ is recorded as the maximum feature value corresponding to the horizontal position direction in $P_i$, for a given missing detection probability $P_{md}$, you can get:

$$a_i = \sqrt{\lambda^{P_i}} \text{erf}^{-1}(1 - P_{md}) \quad (42);$$

Then the horizontal protection level of multi-solution separation method is calculated:

$$HPL = \max(HPL_i) = \max(T_i + a_i) \quad (43);$$

Similarly, the vertical protection level of multi-solution separation method can be calculated:

$$VPL = \max(VPL_i) = \max(D_i + a_i) \quad (44);$$

where, $$T_i = \sqrt{dP_i(3,3)} \, \text{erf}^{-1}\left(\frac{P_{fd}}{2(m+n)}\right); \quad (45)$$

$$a_i = \sqrt{P_i(3,3)} \text{erf}^{-1}(1 - P_{md})$$

(46).

Example 2

Figure 5:
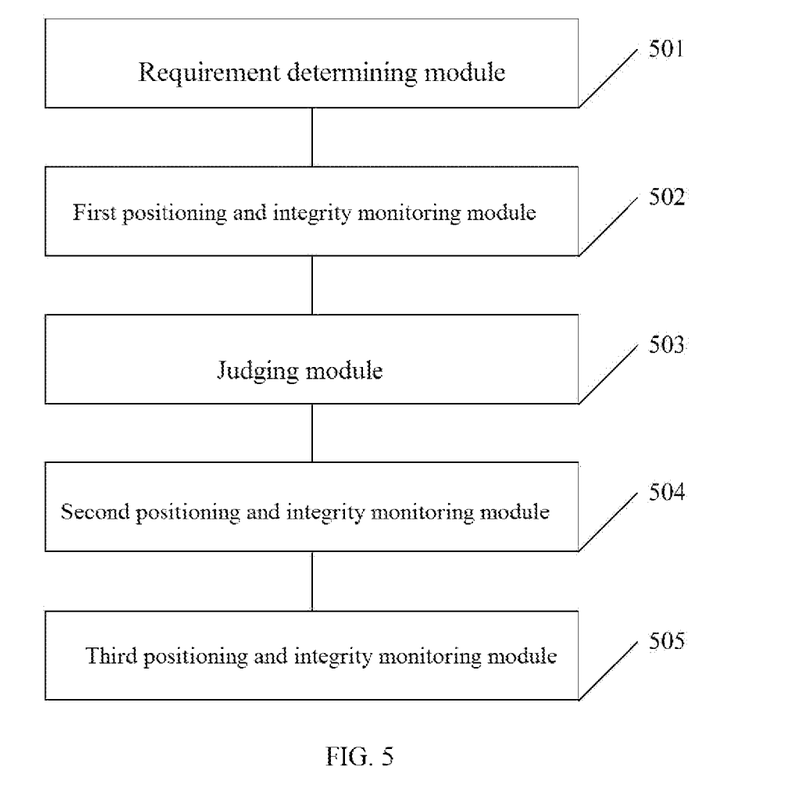
FIG. 5 is a structural diagram of an APNT service positioning and integrity monitoring system of the present invention.

As shown in FIG. 5, an APNT service positioning and integrity monitoring system provided in this embodiment includes:

a requirement determining module 501 configured to determine a positioning accuracy requirement in a target scene;

a first positioning and integrity monitoring module 502 configured to, when the positioning accuracy requirement is high-accuracy positioning, determine a position of an aircraft by adopting a combined positioning algorithm, and monitor the integrity of a combined positioning by adopting a multi-solution separation mode;

a judging module 503 configured to, when the positioning accuracy requirement is low-accuracy positioning, judge whether the aircraft is a high-altitude user;

a second positioning and integrity monitoring module 504 configured to adopt an air-to-air positioning algorithm for a high-altitude user and a low-altitude user based on LDACS to determine the position of the aircraft when the aircraft is a low-altitude user, and adopt a least square residual method to monitor the integrity of the air-to-air positioning;

a third positioning and integrity monitoring module 505 configured to determine the position of the aircraft by adopting a DME/DME-based positioning algorithm when the aircraft is a high-altitude user, and monitor the integrity of the positioning algorithm based on DME/DME.

In the aspect of determining the position of the aircraft by using the air-to-air positioning algorithm of high-altitude users and low-altitude users based on LDACS, the second positioning and integrity monitoring module specifically includes:

a high-altitude user position information unit configured to adopt a Multi-DME positioning algorithm to determine the position information of high-altitude users;

a measurement distance determination unit configured to determine a measurement distance between a high-altitude user and a low-altitude user based on the two-way ranging function of LDACS;

a position determination unit configured to determine the position of the aircraft according to the measured distance and the position information of the high-altitude user.

Compared with the prior art, the innovative parts of the present invention are as follows:

The present invention provides a classification method according to the user's requirements for positioning accuracy and actual application conditions, and provides three different APNT algorithms in consideration of the characteristics of various situations.

1. The algorithm flow of realizing air-to-air relative cooperative positioning by using the two-way ranging function of LDACS is put forward, and the position error $\sigma_{position} = \text{GDOP} \cdot \sigma_D = \sqrt{\text{trace}(H_T H)^{-1}} \cdot \sigma_D$ of ab airborne ranging source realized by Multi-DME and the ranging error $\sigma_n^2 - \sigma_r^2 + \|(G^T(\text{trace}(H^T H)^{-1} \sigma_D^2) G) \cdot 1_{n,j}\|$ of low-altitude users realized by LDACS are given.

2. The unique fault mode in air-to-air cooperative positioning is analyzed, that is, the position information fault of airborne ranging source itself, which is compared with the ephemeris fault in satellite navigation, and the ranging expression $r^{(n)} = (x_u - x_{(n)}) \cdot 1^{(n)} + \Delta r^{(n)} + c \cdot (dt^{(n)} - dt_u) + \varepsilon^{(n)}$ in this fault mode is given. Aiming at this specific fault, the method of using Chi-square test to test the fault and solving the detection threshold is proposed.

3. A horizontal protection level calculation method $HPL=\delta HDOP_{max} \times \sigma_A \times E_r$ suitable for air-to-air cooperative positioning algorithm based on LDACS is proposed to judge the availability of APNT system.

4. The ranging error expressions of DME and LDACS are given, respectively, and the observation equation $$y = Gx + \varepsilon = \begin{bmatrix} a_{1,1} & a_{1,2} & a_{1,3} & 0 \\ \vdots & \vdots & \vdots & \vdots \\ a_{m,1} & a_{m,2} & a_{m,3} & 0 \\ a_{m+1,1} & a_{m+1,2} & a_{m+1,2} & -1 \\ \vdots & \vdots & \vdots & \vdots \\ a_{m+n,1} & a_{m+n,2} & a_{m+n,3} & -1 \end{bmatrix} \begin{bmatrix} \Delta x \\ \Delta y \\ \Delta z \\ cdt \end{bmatrix} + \begin{bmatrix} \varepsilon_D \\ \varepsilon_L \end{bmatrix}$$

of the ranging system composed of m DME two-way ranging and n LDACS pseudo-range measurements is given.

5. A new combined positioning method is proposed to realize APNT service by combining the measurement information of DME/LDACS/barometric altimeter.

6. A method is proposed to convert the observation equation obtained by DME/LDACS combination into a geographic coordinate system through coordinates and combine with the altitude measurements provided by the barometric altimeter to obtain the combined observation equation $$Z = \begin{bmatrix} \rho_{D1} - \hat{\rho}_{D1} \\ \vdots \\ \rho_{Dm} - \hat{\rho}_{Dm} \\ \rho_{L1} - \hat{\rho}_{L1} \\ \vdots \\ \rho_{L1} - \hat{\rho}_{Ln} \\ H_B - \hat{H} \end{bmatrix} = HX + V = \begin{bmatrix} AG \\ 0 & 0 & 1 & 0 \end{bmatrix} \begin{bmatrix} \Delta \phi \\ \Delta \lambda \\ \Delta h \\ cdt \end{bmatrix} + \begin{bmatrix} \varepsilon_D \\ \varepsilon_L \\ \varepsilon_B \end{bmatrix},$$

and the least square method is used to locate and solve it.

7. According to the characteristics of DME/LDACS/barometric altimeter integrated positioning system, the process of using multi-solution separation algorithm to monitor the integrity is given. According to the state equation, the main state estimate $X_0=Q_0Z=(H^T WH)^{-1}H^TWZ$ and sub-state estimate $X_i=Q_iZ$ are calculated, a new horizontal position test statistics $d_i=\sqrt{dP_i(1,1)+dP_i(2,2)}$ is constructed according to the characteristics of the system, the detection threshold $$T_i = \sqrt{\lambda^{dP_i}} \, \text{erf}^{-1}\left(\frac{P_{fd}}{2(m+n)}\right)$$

is calculated, and the fault judgment of the system is made according to the inspection statistic and fault detection threshold.

8. After the fault is detected, the process of APNT ranging source fault isolation is given by calculating the state sub-estimate $X_i$ of and secondary-estimate $X_{i,j}$ of the sub-estimate.

9. Based on the covariance matrix of the difference between the main estimate and the sub-estimate, and the false detection probability and false alarm probability of the system, a method for calculating APNT horizontal and vertical protection level is proposed.

It can be seen from the solution provided by the present invention that the beneficial effects of the present invention are as follows:

firstly, the present invention provides a variety of APNT options for aircraft, and provides a solution to the positioning problem of aircraft when GNSS is unavailable;

secondly, according to the two-way ranging function of LDACS, the present invention provides a relative positioning method for low-altitude users shielded by terrain or buildings;

thirdly, the present invention puts forward a method of combined positioning by DME/LDACS/barometric altimeter to further improve the positioning accuracy of APNT;

fourthly, in order to realize the integrity monitoring of APNT, the present invention provides a fault detection algorithm suitable for each positioning algorithm, and proves the availability of the algorithm by calculating the protection level;

fifthly, the present invention is helpful to improve the attention of APNT in China and promote the popularization and application of its algorithm.

In this specification, each embodiment is described in a progressive way, and the differences between each embodiment and other embodiments are highlighted, so the same and similar parts of each embodiment can be referred to each other. For the system disclosed in the embodiment, the description is relatively simple because it corresponds to the method disclosed in the embodiment. Please refer to the description of the method section for the relevant points.

In this paper, specific examples are used to explain the principle and implementation of the present invention, and the explanations of the above embodiments are only used to help understand the method and core ideas of the present invention; At the same time, according to the idea of the present invention, there will be some changes in the specific implementation and application scope for those of ordinary skill in the field. To sum up, the contents of this specification should not be construed as limiting the present invention.

What is claimed is:

1. An APNT service positioning and integrity monitoring method, comprising the following steps of:
   determining a positioning accuracy requirement in a target scene;
   when the positioning accuracy requirement is high-accuracy positioning, determining a position of an aircraft by adopting a combined positioning algorithm, and monitoring the integrity of a combined positioning by adopting a multi-solution separation mode;
   when the positioning accuracy requirement is low-accuracy positioning, judging whether the aircraft is a high-altitude user;
   if not, adopting an air-to-air positioning algorithm for a high-altitude user and a low-altitude user based on LDACS to determine the position of the aircraft, and adopting a least square residual method to monitor the integrity of the air-to-air positioning.

2. The APNT service positioning and integrity monitoring method according to claim 1, further comprising: when the aircraft is a high-altitude user, adopting a positioning algorithm based on DME/DME to determine the position of the aircraft, and monitoring the integrity of the positioning algorithm based on DME/DME.

3. The APNT service positioning and integrity monitoring method according to claim 2, wherein the step of monitoring the integrity of the positioning algorithm based on DME/DME specifically comprises:

calculating the positions of the aircraft before and after the introduction of a new observation station;

calculating a protection level of the positioning algorithm based on DME/DME based on the positions of the aircraft before and after the introduction of the new observation station;

comparing the protection level with a level alarm limit required by a route to complete the monitoring of the integrity of the positioning algorithm based on DME/DME.

4. The APNT service positioning and integrity monitoring method according to claim 1, wherein the step of adopting an air-to-air positioning algorithm for a high-altitude user and a low-altitude user based on LDACS to determine the position of the aircraft specifically comprises:

adopting a Multi-DME positioning algorithm to determine the position information of high-altitude users;

determining a measurement distance between a high-altitude user and a low-altitude user based on the two-way ranging function of LDACS;

determining the position of the aircraft according to the measured distance and the position information of the high-altitude user.

5. The APNT service positioning and integrity monitoring method according to claim 1, wherein the step of adopting a least square residual method to monitor the integrity of the air-to-air positioning specifically comprises:

calculating a fault detection threshold according to a false detection probability of a system;

calculating a minimum detectable fault according to the detection threshold and a missed detection probability;

calculating a horizontal accuracy factor of the system;

calculating a horizontal protection level of the system from the minimum detectable fault and the level accuracy factor;

completing integrity monitoring of air-to-air positioning based on the horizontal protection level.

6. The APNT service positioning and integrity monitoring method according to claim 1, wherein the method of determining a position of an aircraft by adopting a combined positioning algorithm specifically comprises:

calculating a ranging error obtained by two-way ranging of m DME stations and a pseudo-range error obtained by one-way measurement of n LDACS stations;

constructing an observation equation of a ranging system based on the ranging error and the pseudo-range error;

taking a barometric altitude as an observation quantity, and introducing a barometric altimeter into the system to obtain an altitude observation equation;

constructing an observation model of the system based on the observation equation and the altitude observation equation;

solving the observation model by the least square method to determine the position of the aircraft.

7. The APNT service positioning and integrity monitoring method according to claim 6, wherein the step of monitoring the integrity of a combined positioning by adopting a multi-solution separation mode specifically comprises:

calculating a state main estimate and a state sub-estimate based on the observation model of the system;

calculating a difference covariance matrix based on the state main estimate and the state sub-estimate;

constructing horizontal position test statistics based on the difference covariance matrix;

calculating the fault detection threshold according to the false detection probability;

determining whether there is a fault or not according to the test statistics and the detection threshold;

if there is a fault, isolating the fault and calculating the protection level of the system;

if there is no fault, directly calculating the protection level of the system;

completing the integrity monitoring of combined positioning according to the protection level.

8. An APNT service positioning and integrity monitoring system, comprising:

a requirement determining module configured to determine a positioning accuracy requirement in a target scene;

a first positioning and integrity monitoring module configured to, when the positioning accuracy requirement is high-accuracy positioning, determine a position of an aircraft by adopting a combined positioning algorithm, and monitor the integrity of a combined positioning by adopting a multi-solution separation mode;

a judging module configured to, when the positioning accuracy requirement is low-accuracy positioning, judge whether the aircraft is a high-altitude user;

a second positioning and integrity monitoring module configured to adopt an air-to-air positioning algorithm for a high-altitude user and a low-altitude user based on LDACS to determine the position of the aircraft when the aircraft is a low-altitude user, and adopt a least square residual method to monitor the integrity of the air-to-air positioning.

9. The APNT service positioning and integrity monitoring system according to claim 8, further comprising a third positioning and integrity monitoring module configured to adopt a positioning algorithm based on DME/DME to determine the position of the aircraft when the aircraft is a high-altitude user, and monitor the integrity of the positioning algorithm based on DME/DME.

10. The APNT service positioning and integrity monitoring system according to claim 8, wherein as for adopting an air-to-air positioning algorithm for a high-altitude user and a low-altitude user based on LDACS to determine the position of the aircraft, the second positioning and integrity monitoring module specifically comprises:

high-altitude user position information unit configured to adopt a Multi-DME positioning algorithm to determine the position information of high-altitude users;

a measurement distance determination unit configured to determine a measurement distance between a high-altitude user and a low-altitude user based on the two-way ranging function of LDACS;

a position determination unit configured to determine the position of the aircraft according to the measured distance and the position information of the high-altitude user.

* * * * *